Patented June 3, 1930

1,762,022

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZODYESTUFFS INSOLUBLE IN WATER AND PROCESS OF MAKING SAME

No Drawing. Application filed January 29, 1929, Serial No. 336,003, and in Germany February 1, 1928.

In U. S. Patent No. 1,505,568 azodyestuffs are described which are produced by combining any diazocompound not containing a sulfonic nor carboxylic group with a di-acylacetyl-compound of the benzidine series.

Our present invention relates to certain embodiments of the specification above referred to and consists in combining the diazo-compound of 2.3.4-trichloro-aniline with a di-acetoacetyl-diamino-diaryl compound of the general formula:

$$CH_3.CO.CH_2.CO.NH—X—NH.CO.CH_2.CO.CH_3,$$

wherein X means a diphenyl residue which may contain further substituents.

The new dyestuffs thus obtained correspond most probably to the general formula:

$$CH_3.CO.CH.CO.NH—X—NH.CO.CH.CO.CH_3$$

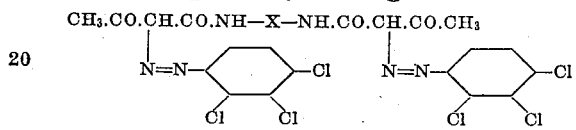

wherein X has the aforesaid significance.

They dye clear yellow shades of a very good fastness to light and may be used for manufacturing valuable color lakes or they may be produced on the vegetable fiber according to the ice-color method, thus yielding fast dyeings and printings of a particular value.

In order to further illustrate our invention the following examples are given.

*Example 1.*—39, 3 parts of 2.3.4-trichloro-aniline are diazotized in the customary manner and the diazosolution is combined with a solution of 38 parts of di-acetoacetyl-ortho-tolidine in a dilute caustic soda solution, containing Turkey red oil and a sufficient amount of sodium acetate for neutralizing the excess of the mineral acid. The separated dyestuff corresponding probably to the formula:

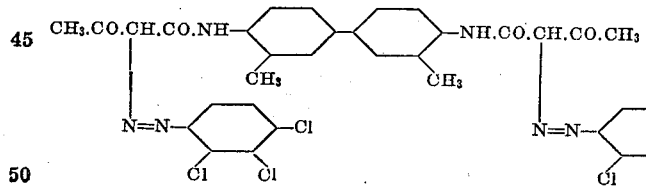

is filtered off and well washed. It may be advantageously used in the form of a paste and yields when mixed with a substratum in the usual manner a clear yellow lake of a very good fastness to light.

*Example 2.*—In order to produce the same dyestuff on the fiber, one may proceed as follows:

Well boiled and dried cotton yarn is impregnated with a solution containing per liter 3 grs. of di-acetoacetyl-ortho-tolidine,
6 cc. of a caustic soda solution of 34° Bé.,
10 cc. of Turkey red oil and
28 grs. of Glauber's salt.

The goods are well wrung out and developed with a diazo solution corresponding to 2 grs. of 2.3.4-trichloro-aniline per liter and to which the sufficient amount of sodium acetate is added. Then they are rinsed, soaped and dried.

In this manner a full yellow dyeing of a very good fastness to light is obtained. The dyestuff thus produced on the fiber is identical with that described in Example 1.

It may also be prepared by the printing process according to one of the customary methods.

We wish to be understood that the term "combining" in the following claims means everywhere combining in substance or on a substratum especially on the fiber.

We claim:

1. A process which comprises combining the diazo compound of 2.3.4-trichloro-aniline with a di-acetoacetyl-diamino-diaryl compound of the general formula:

$$CH_3.CO.CH_2.CO.NH—X—NH.CO.CH_2.CO.CH_3$$

wherein X means a diphenyl residue which may contain further substituents.

2. A process which comprises combining the diazo compound of 2.3.4-trichloro-aniline with di-acetoacetyl-ortho-tolidine of the formula:

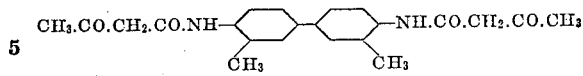

3. As new compounds the azodyestuffs corresponding probably to the general formula:

wherein X means a diphenyl residue which may contain further substituents, which compounds are when dry yellow to brownish yellow powders, insoluble in water, yielding valuable color lakes when mixed with a substratum and fast dyeings and printings when produced on the fiber.

4. As a new compound the azodyestuff corresponding probably to the formula:

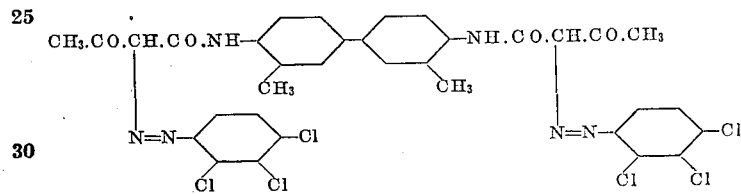

which compound is when dry a yellow powder insoluble in water yielding a clear yellow lake when mixed with a substratum and yellow dyeings and printings showing a very good fastness to light when produced on the fiber.

5. Materials dyed or printed with the new dyestuffs of claim 3, the dyestuffs being produced on the materials.

6. Materials dyed or printed with the new dyestuffs of claim 4, the dyestuffs being produced on the materials.

In testimony whereof, we affix our signatures.

LEOPOLD LASKA.
ARTHUR ZITSCHER.